Jan. 4, 1955

H. HOWE 2,698,726

BROILER STAND

Filed Feb. 8, 1951

INVENTOR
HAROLD HOWE
BY
Hoag, Kilburn & Carlson.
ATTORNEYS.

United States Patent Office 2,698,726
Patented Jan. 4, 1955

2,698,726

BROILER STAND

Harold Howe, Rowayton, Conn.

Application February 8, 1951, Serial No. 209,963

2 Claims. (Cl. 248—46)

This invention relates to a broiler stand.

Heretofore means have been suggested for supporting the handle of a broiler or the like to facilitate cooking over an open fire but such means have been unsatisfactory because of their bulkiness and the difficulty of readily packing and transporting them, and their cost in proportion to their usefulness.

It is an object of this invention to provide apparatus for supporting a broiler or the like which is simple, durable and effective.

Another object of the invention is to provide a portable broiler stand for use indoors or outdoors.

Another object of the invention is to provide such a device which may be readily positioned with respect to an open fire, and by means of which a steak or other article being cooked may be supported at a plurality of different heights above the fire.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a perspective view showing the broiler stand in full lines and indicating in dotted lines a broiler supported at one of several alternative support levels;

The broiler stand which is the subject of this application comprises the standard 10 and a plurality of means for engaging the handle of a broiler so that the broiler may be supported over a fire at a plurality of different distances above the fire. As shown herein each means for engaging the broiler handle comprises means for contacting the handle on its upper and lower surfaces respectively, at different distances along the handle, whereby the tendency of the main portion 12 of the broiler to rotate downwardly will cause its handle portion 14 to be frictionally engaged by said support means. As shown each of said support means comprises a U-shaped bracket indicated by the numerals 16, 18, 20 and 22 respectively, each comprising the end arm portions a and b, and the intermediate portion c, welded or otherwise secured to standard 10, the outer extremities at least of said arms a and b being curved so as to resist inadvertent displacement of a handle which has been inserted between said arms.

Figure 1:
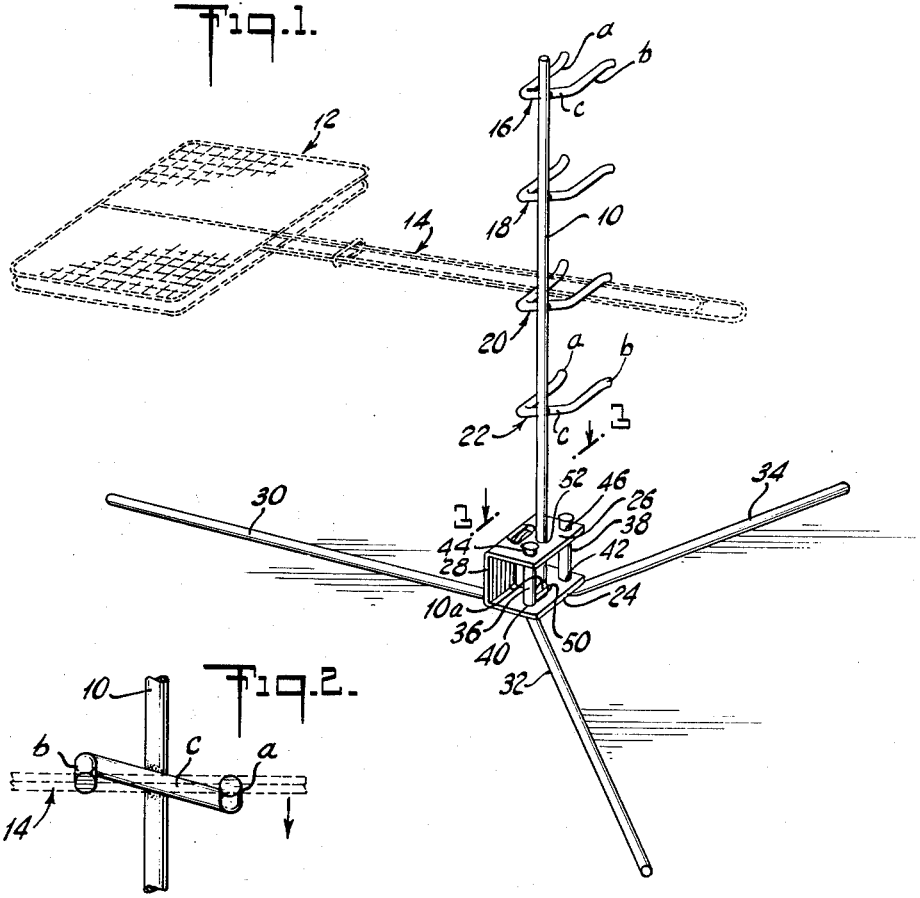
Figure 2:
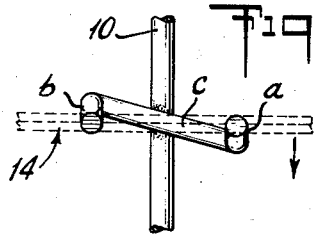
Figure 2 is an end view looking at the ends of the fingers comprising one of the brackets shown in Figure 1.
Figure 3:
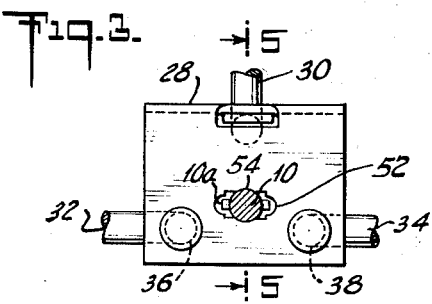
Figure 3 is a plan view taken on line 3—3 of Figure 1.
Figure 4:
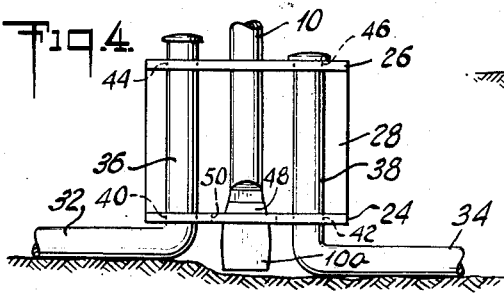
Figure 4 is a rear elevational detail view of the base or support means for said upright member.
Figure 5:
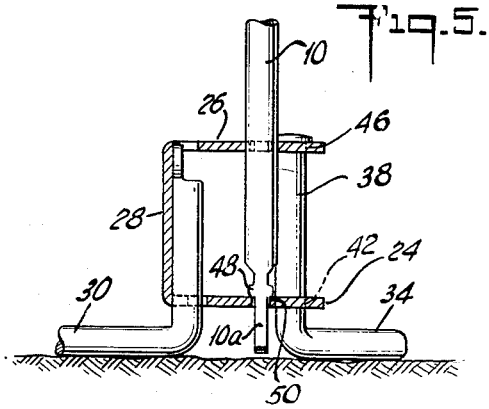
Figure 5 is a view, partly in cross section, taken on the line 5—5 of Figure 3.

Preferably the arms a and b lie in different horizontal planes, the difference between said planes being substantially the thickness of the handle of the broiler. As illustrated in Figure 1 arm a, which is in advance of arm b, is in a lower plane than arm b. With this arrangement of the arms a and b the support member selected will engage and hold the handle of the broiler in a plane substantially normal to the standard 10, which means that the head or main portion of the broiler may be supported so that it is level with all portions of it substantially the same distance above the fire, whereby it may be utilized as a support for a variety of foods and cooking utensils and the like.

A standard 10 having one or more of said brackets 16, 18, 20 and 22, may be employed alone, as for example by inserting the lower end of standard 10 in the ground, or it may be used in combination with a supporting base which is desirable when using the stand indoors or on any hard surface.

Desirably the standard 10 is a metal rod and the brackets are likewise of metal. The upwardly curving end of arm a and the downwardly curving end of arm b may be extended forming an endless bracket through which the broiler handle 14 may be inserted endwise.

Various different bases may be employed, the one illustrated herein comprises the lower member 24 and the upper member 26, spaced from member 24 by the vertically extending member 28. Projecting radially forward from the lower member 24 and fixedly related thereto is the leg 30. Also projecting radially from said surface 24 are the legs 32 and 34 respectively which, as shown herein, comprise the upwardly bent portions 36 and 38 respectively which extend upwardly through apertures 40 and 42 respectively in said lower member 24 and through apertures 44 and 46 respectively provided in said upper member 26, said apertures being large enough to permit rotation therein of said portions 36 and 38 respectively, the upper ends of said portions 36 and 38 being enlarged above member 26, as by peening, to keep them assembled with members 24 and 26. Thus said legs 32 and 34 are rotatably mounted with respect to fixed leg 30 and may be angularly adjusted with respect to one another, giving the stand flexibility as to the space occupied by the base portion of the stand and as to the angular relation of the legs one to another.

Said standard 10 preferably has portions of different cross sectional design. As shown herein the lower portion 10ᵃ of said standard is flattened and provided with a shoulder 48 a predetermined distance above its end while the standard above said flattened portion is cylindrical. Lower surface 24 has therein a slot 50 through which the said flattened lower end portion of said standard may be inserted, and said upper member 26 is provided with an aperture 52 through which the flattened end portion 10ᵃ of standard 10 may be inserted and which also has a portion 54 adapted to receive and engage the cylindrical portion of said standard 10, above said flattened lower portion 10ᵃ. The edges of said upper and lower surfaces respectively defining said apertures coact with the different cross sections of different portions of standard 10 to positively engage standard 10 when inserted through said apertures, and maintain it in upright position, preventing it from sidewise movement as well as from rotation.

Desirably the legs 30, 32 and 34 are of metal and the surfaces 24, 26 and 28 may be provided by bending a piece of sheet metal into channel form.

When not in use the standard 10 is demountable from the base means, and the legs 32 and 34 of the base means are movable from the spread position shown in Figure 1 to a position in which they extend in the same direction as, and substantially parallel with, fixed leg 30. In this collapsed position the legs may be placed in the channel defined by the arms a and b of the brackets 16, 18, 20 and 22 of said standard 10, with said legs extending substantially parallel with the standard 10, for convenience in boxing and shipping the stand.

In use the standard 10 is inserted through the aperture 52 in upper surface 26 and the flattened lower end portion of standard 10 is inserted through aperture 50 in the lower surface 24, the extent to which said standard extends below the surface 24 being determined by the position of shoulder 48. This shoulder is positioned at a distance from the lower end of the standard which is less than the distance between the lower surface 24 and the ground or floor on which the legs 30, 32 and 34 rest. In the process of forming said shoulder the end portion of the standard may be flattened and given a width in excess of the diameter of its portion which extends through aperture 52 in said upper surface.

The apparatus described herein has the advantages that it may be readily disassembled and folded into a small space for transportation or storage, and may be quickly and easily set up for use either indoors or outdoors. It will readily support a broiler or the like in any of a plurality of levels above a fire, permitting the broiler to be readily changed from one level to another level as may be desired. The broiler holding means are so devised that they resist inadvertent displacement of the broiler handle once it has been positioned, and maintain the broiler or the like level, whereby the broiler, if desired, may also be used as a support for cooking utensils.

The base structure defined herein is convenient and flexible in use. The whose assembly may be quickly and easily positioned in relation to a fire by simply grasping the portion comprising the surfaces 26 and 24 and pushing it toward the fire, which movement will position leg 30 extending toward, or into, the fire, and will cause legs 32 and 34 to fan out into a position more or less as shown in Figure 1. If rocks, andirons or any other objects are in the way, legs 32 and 34 may be rotated into positions to avoid such obstacles, and will provide adequate support even if rotated into positions where they define an angle of 90° or less with respect to fixed leg 30. The engagement of standard 10 at two points along its length, by surfaces 24 and 26 respectively, provides a firm support. The flattened end of standard 10 cooperates with slot 50 to prevent rotation of said standard 10, while the profile of aperture 52 and the cross section of the portion of the standard engaged therein cooperates with the profile of slot 50 and the cross section of the lower end of the standard to prevent twisting or sidewise movement of the standard 10 when used with the base means described herein.

It will thus be seen that there has been provided by this invention an apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. Support means for the standard of a broiler stand or the like which comprises a channel member positioned with one side wall positioned above the other side wall in vertical alignment therewith and spaced apart by the intermediate wall, said vertically aligned walls being slotted to receive a standard, a leg projecting radially from said channel member in fixed relation thereto, and a plurality of other leg members having end portions extending through the vertically disposed walls of said channel member and pivotable around vertical axes, and having main portions extending at right angles to said end portions and projecting radially from said channel member.

2. The structure as claimed in claim 1 in which said movable legs are pivotable from a collapsed position in which they are substantially parallel with said fixed leg to an unfolded position in which they are angularly related to said fixed leg.

References Cited in the file of this patent

UNITED STATES PATENTS

| Number | Name | Date |
|---|---|---|
| Re. 19,810 | Meusy | Jan. 7, 1936 |
| 961,234 | Hoover | June 14, 1910 |
| 1,170,684 | Schlieckert | Feb. 8, 1916 |
| 1,410,798 | Cowdery | Mar. 28, 1922 |
| 1,447,579 | Thomas | Mar. 6, 1923 |
| 1,464,279 | Hindley | Aug. 7, 1923 |
| 1,697,966 | Rubel | Jan. 8, 1929 |
| 2,128,409 | Hager | Aug. 30, 1938 |
| 2,431,164 | Borgolte | Nov. 18, 1947 |
| 2,519,612 | Tuttle | Aug. 22, 1950 |
| 2,635,178 | Wolter | Apr. 14, 1953 |